US012722381B2

(12) United States Patent
Goto et al.

(10) Patent No.: US 12,722,381 B2
(45) Date of Patent: Sep. 1, 2026

(54) LIQUID EJECTION APPARATUS AND METHOD OF CONTROLLING THE SAME

(71) Applicant: CANON KABUSHIKI KAISHA, Tokyo (JP)

(72) Inventors: Akira Goto, Kanagawa (JP); Keiji Tomizawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 194 days.

(21) Appl. No.: 18/626,618

(22) Filed: Apr. 4, 2024

(65) Prior Publication Data

US 2024/0351337 A1 Oct. 24, 2024

(30) Foreign Application Priority Data

Apr. 19, 2023 (JP) ................................ 2023-068749

(51) Int. Cl.
*B41J 2/175* (2006.01)
*B41J 2/21* (2006.01)

(52) U.S. Cl.
CPC ......... *B41J 2/1752* (2013.01); *B41J 2/17526* (2013.01); *B41J 2/17536* (2013.01); *B41J 2/17546* (2013.01); *B41J 2/2107* (2013.01)

(58) Field of Classification Search
CPC .. B41J 2/1752; B41J 2/17506; B41J 2/17509; B41J 2/17526; B41J 2/1753; B41J 2/17536; B41J 2/17546; B41J 2/2107
See application file for complete search history.

(56) References Cited

U.S. PATENT DOCUMENTS

| | | | | |
|---|---|---|---|---|
| 8,985,721 | B2 | 3/2015 | Tomizawa | |
| 9,266,325 | B2 | 2/2016 | Tomizawa | |
| 10,308,018 | B2 | 6/2019 | Miura | |
| 10,710,361 | B2 | 7/2020 | Misumi | |
| 12,023,924 | B2 | 7/2024 | Tomizawa | |
| 2007/0081057 | A1* | 4/2007 | Kim | B41J 2/195 347/86 |
| 2007/0211091 | A1* | 9/2007 | Kusunori | B41J 2/1433 347/14 |
| 2007/0285447 | A1* | 12/2007 | Sugahara | B41J 29/393 347/54 |
| 2019/0061343 | A1 | 2/2019 | Misumi | |
| 2022/0317941 | A1* | 10/2022 | Yamada | G06F 3/1261 |
| 2023/0007995 | A1 | 1/2023 | Hamada | |
| 2023/0103488 | A1 | 4/2023 | Aizawa | |

(Continued)

FOREIGN PATENT DOCUMENTS

JP 2019-038127 A 3/2019

*Primary Examiner* — Anh T Vo
(74) *Attorney, Agent, or Firm* — Venable LLP

(57) ABSTRACT

A liquid ejection apparatus that includes a cartridge containing liquid and a heat resistor generating heat to eject the liquid and that forms an electric field by a first electrode, which is a part of a protective layer protecting a surface of the heat resistor, and a second electrode corresponding to the first electrode with the liquid interposed therebetween, includes: a reading unit that reads cartridge information from a storage unit of the cartridge; and a determination unit that determines an electric potential difference between electric potential of the first electrode and electric potential of the second electrode according to the cartridge information.

8 Claims, 10 Drawing Sheets

(56) References Cited

U.S. PATENT DOCUMENTS

| | | | | |
|---|---|---|---|---|
| 2023/0314997 | A1* | 10/2023 | Imanishi | G03G 21/1875 399/12 |
| 2024/0190129 | A1 | 6/2024 | Moriya | |
| 2024/0208225 | A1 | 6/2024 | Tanaka | |

* cited by examiner

RANK 0

RANK -1

RANK -2

RANK 1

RANK 2

LIQUID EJECTION APPARATUS AND METHOD OF CONTROLLING THE SAME

BACKGROUND OF THE INVENTION

Field of the Invention

The present disclosure relates to a liquid ejection apparatus including a head that ejects liquid such as ink.

Description of the Related Art

There has been known an ink jet printing method as a printing method employed by a printing apparatus such as a multifunction printer. In an ink ejection apparatus that employs the ink jet printing method, an ink jet head (hereinafter, also referred to as a (printing) head) that ejects liquid such as ink is mounted. Additionally, there has been known a method using an electrothermal conversion element (hereinafter, referred to as a heater) including a heat resistor as a method of generating energy to eject the ink from an ejection port of the printing head.

The printing head using the heater has had a problem that kogation of the ink occurs on a surface of the heater due to the heating of the ink by the heater, and the ejection characteristics are changed significantly. Japanese Patent Laid-Open No. 2019-038127 (hereinafter, referred to as PTL 1) describes a head that includes one electrode that is an upper protective layer covering a heated portion of the heater and a counter electrode that generates an electric field between the counter electrode and the electrode of the upper protective layer with the ink interposed therebetween. In a case of printing, electric potential of the counter electrode is set relatively greater than electric potential of the electrode of the upper protective layer to prevent adhesion of the kogation on the upper protective layer.

However, the degree of the kogation of the ink is different depending on the ink type, a temporal change in the physical properties of the ink, and the like. Therefore, it has been difficult with the conventional method to prevent the adhesion of the kogation under various ink conditions.

SUMMARY OF THE INVENTION

An embodiment of the present disclosure is a liquid ejection apparatus that includes a cartridge containing liquid and a heat resistor generating heat to eject the liquid and that forms an electric field by a first electrode, which is a part of a protective layer protecting a surface of the heat resistor, and a second electrode corresponding to the first electrode with the liquid interposed therebetween, including: a reading unit configured to read cartridge information from a storage unit of the cartridge; and a determination unit configured to determine an electric potential difference between electric potential of the first electrode and electric potential of the second electrode according to the cartridge information.

Further features of the present invention will become apparent from the following description of exemplary embodiments with reference to the attached drawings.

DESCRIPTION OF THE EMBODIMENTS

Figure 1:
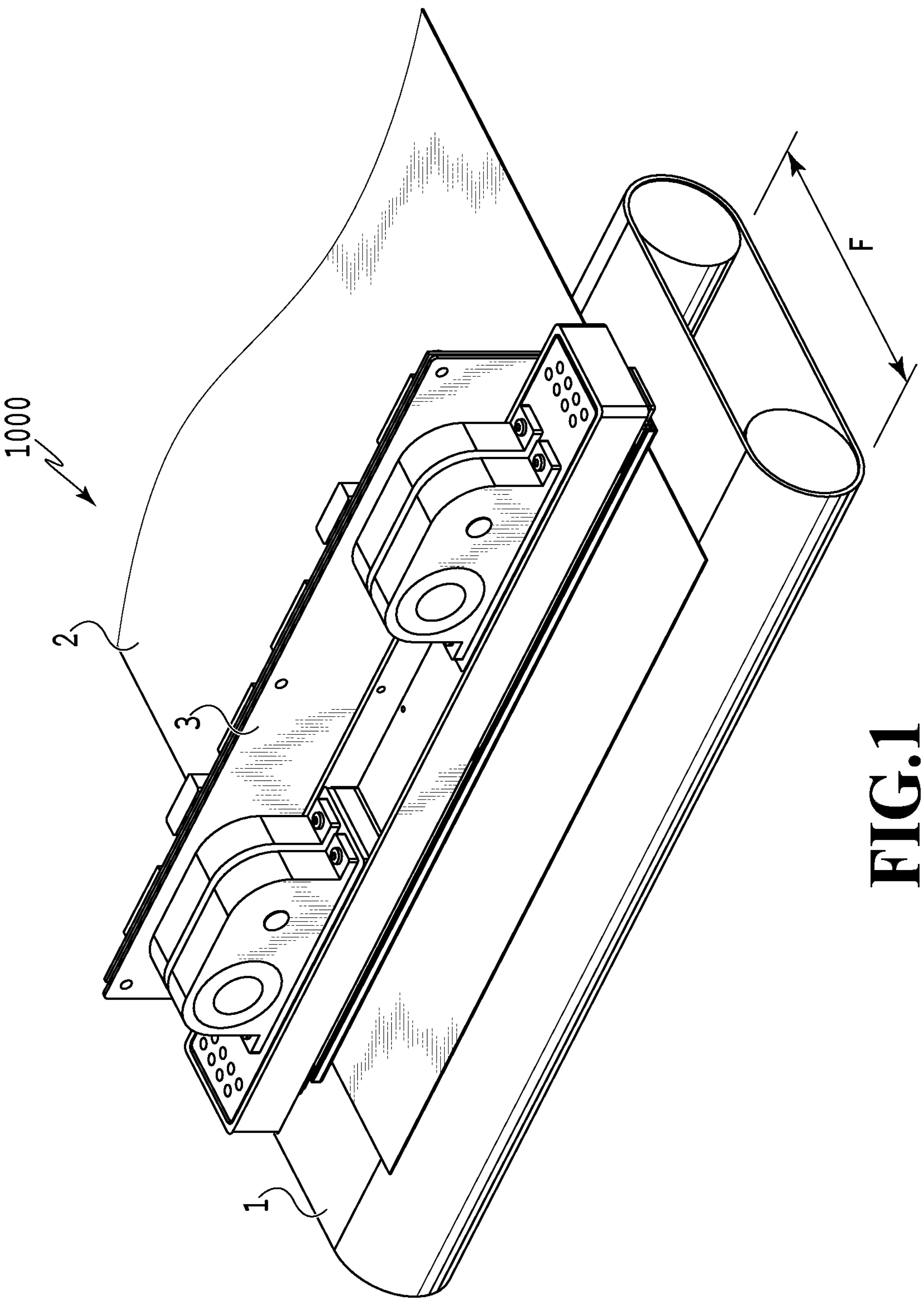
FIG. 1 is a diagram illustrating a schematic configuration of an ink ejection apparatus according to the present embodiment.

Hereinafter, an embodiment of the present disclosure is described with reference to the drawings. In printing methods employed by a printing apparatus such as a multifunction printer, an ink jet printing method has been widely employed because it is a non-impact printing method and allows for low-noise, high-density, and high-speed printing. An ink ejection apparatus (hereinafter, also referred to as a printing apparatus) includes a mechanism to drive a carrier in which a printing head is mounted, a conveyance mechanism to convey a printing medium such as printing paper, and a control configuration to control the mechanisms. As a method of generating energy to eject the ink from an ejection port of the printing head, there are a method of pressurizing the ink by using an electromechanical conversion element such as a piezo element and a method of using a pressure of an air bubble by generating a bubble by heating by radiation of an electromagnetic wave such as a laser. Additionally, there is a method of generating a bubble by heating the ink by an electrothermal conversion element including a heat resistor (hereinafter, referred to as a heater).

The printing head using the heater has had a problem that kogation of the ink occurs on a surface of the heater due to the heating of the ink by the heater. The ink used by the printing head in the ink jet printing method is usually the ink containing a colorant of a dye type or a pigment type. Such a colorant is usually insoluble or poorly-soluble in water. Therefore, it has been known that the kogation of the ink containing the insoluble or poorly-soluble substance on the above-described heater changes the ejection characteristics or, for example, changes the ejection speed significantly. In a case of continuous use of the ink that is likely to cause the kogation, the ejection characteristics are changed significantly (for example, the ejection speed is reduced), and thus there is a possibility of a harmful effect on an image formed on the printing medium. For example, the harmful effect is a thin line, quality deterioration of a character, change in a color, and the like due to the deviation of a landing position of the ink.

In the ink ejection apparatus, the ink filled in an ink cartridge is used. Electric charge of a color material dissolved in the ink is different depending on the color material.

Additionally, in the ink of low electric conductance (electroconductivity) or low conductivity, the permittivity is also different depending on the ink. Accordingly, in a conventional method, the optimal electric potential that prevents the adhesion of the kogation is different depending on the ink type. In addition, in a case of pigment ink, the optimal electric potential that prevents the adhesion of the kogation is different depending on an average particle diameter of the pigment.

Moreover, the ink is prepared by a batching method in the preparation, and since the physical properties of the ink are different depending on a manufacturing lot at that time, the optimal electric potential that prevents the adhesion of the kogation is different. A continuous method is also used in manufacturing the ink, and even in the continuous method, in some cases, the optimal electric potential that prevents the adhesion of the kogation may be changed depending on a material lot.

In addition, in a distribution process of the ink cartridge, the physical properties of the ink are changed over time. It is possible to obtain the ink cartridge from a mass retailer, an agent, or through the Internet. However, since the ink cartridge is made of resin, evaporation of a volatile component during the distribution process cannot be prevented completely. It can be considered that, because of the change in the physical properties of the ink due to the evaporation of the volatile component, the optimal electric potential that prevents the adhesion of the kogation is also changed. Additionally, ink viscosity rises due to the evaporation of the volatile component, and zeta electric potential of an ink droplet also rises. In addition, the change in the physical properties of the ink advances also during the mounting of the ink cartridge into the ink ejection apparatus.

Given the circumstances, in the present embodiment, the adhesion of the kogation is prevented by an electric field control mechanism in a pressure chamber in which the heater is disposed even under various ink conditions such as differences in ink type and changes in the physical properties of the ink over time.

Additionally, in the present embodiment, an ink ejection apparatus including a line type head having a length corresponding to a width of a printed medium is exemplified as the printing apparatus; however, it is also possible to apply the present embodiment to a serial type ink ejection apparatus that performs printing while scanning the printed medium. As a configuration of the serial type ink ejection apparatus, for example, a configuration in which one printing element substrate for black ink and one printing element substrate for color ink are mounted may be applied. In addition, a configuration in which several printing element substrates are arranged such that ejection ports are overlapped with each other in a row direction of the ejection ports to create a short line head that is shorter than the width of the printed medium, and the line head scans the printed medium may be applied. The printing apparatus of the present embodiment is a circulation type ink ejection apparatus in which the ink from the ink cartridge is circulated between a tank provided in the printing apparatus and the ink ejection apparatus; however, a mode of a non-circulation type may be applied.

<Ink Ejection Apparatus>

FIG. 1 is a diagram illustrating a schematic configuration of an ink ejection apparatus 1000 according to the present embodiment. FIG. 1 illustrates an example of a liquid ejection apparatus that performs printing by ejecting liquid such as ink. The ink ejection apparatus 1000 includes a conveyance unit 1 that conveys a printed medium 2 and a line type liquid ejection head 3 that is arranged substantially orthogonal to a conveyance direction of the printed medium 2. The ink ejection apparatus 1000 is a line type printing apparatus that performs continuous printing in one pass by conveying multiple printed mediums 2 continuously or intermittently. The printed medium 2 is not limited to cut paper and may be continuous roll paper.

The liquid ejection head 3 can perform full color printing by four types of ink or, for example, CMYK (cyan, magenta, yellow, and black) ink. An ink supply unit that forms a supply passage to supply the ink to the head, a buffer tank, and an ink cartridge are in fluid connection with the liquid ejection head 3. In the liquid ejection head 3, at least one printing element substrate is arranged for each color of ink, and in the printing element substrate, many ejection ports and many heaters corresponding to the many ejection ports, respectively, are provided. Each heater generates heat by an electric signal, generates film boiling in the surrounding ink, and ejects the ink from the ejection port by an air bubble that is rapidly expanded to perform printing on the printed medium 2.

A main body of the ink ejection apparatus 1000 includes a main circuit board that supplies electric power to the liquid ejection head 3 and outputs a control signal for the ink ejection and is electrically connected with the liquid ejection head 3. Note that, although FIG. 1 illustrates the ink ejection apparatus 1000 including the cartridges of four colors, the present disclosure is not intended to limit the number of the cartridges containing the liquid and the number of the ink colors.

<Structure of Thermal Effective Portion in Printing Element Substrate>

Figure 2A:
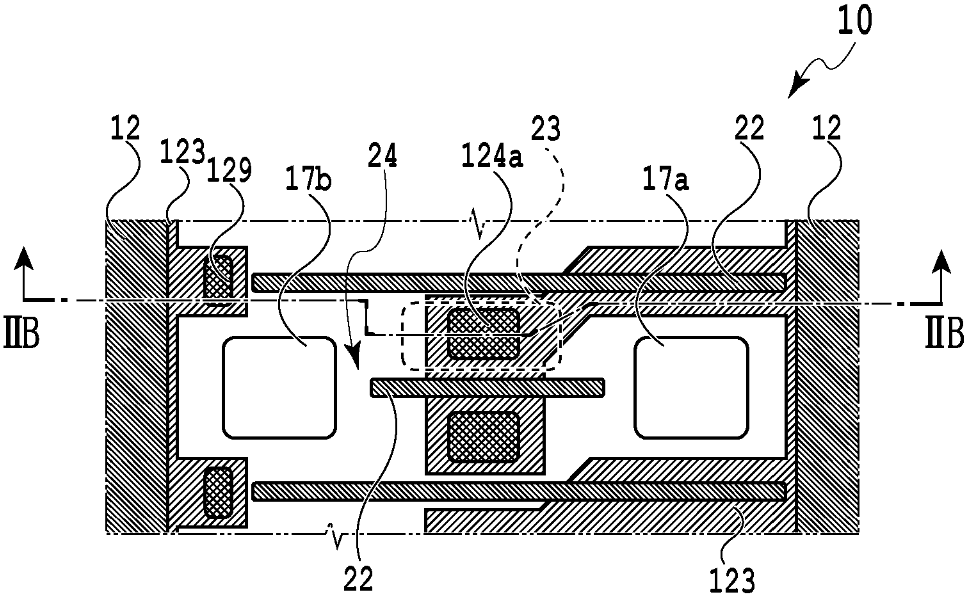
FIGS. 2A and 2B are diagrams illustrating a configuration of a printing element substrate of the ink ejection apparatus of the present embodiment.
Figure 2B:
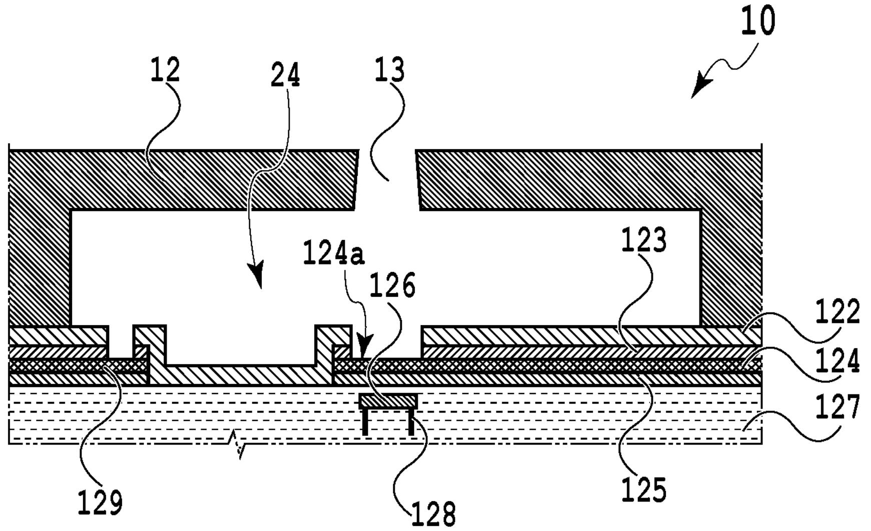

FIGS. 2A and 2B are diagrams illustrating a configuration of a printing element substrate 10 of the ink ejection apparatus of the present embodiment. FIG. 2A is a plan view schematically illustrating a structure of a thermal effective portion including the heater that is one of the ejection ports provided in the printing element substrate 10. FIG. 2B is a cross-sectional view taken along a dash-dotted line IIb-IIb in FIG. 2A.

The printing element substrate 10 is formed by laminating multiple layers on a base formed of silicon. In the liquid ejection head 3 of the present embodiment, the printing element substrate 10 in which a heat accumulation layer formed of a thermal oxide film, an SiO film, an SiN film, and the like is arranged on the base is used. On the heat accumulation layer, a heat resistor 126 covered with an insulation protective layer 127 is arranged. An electrode wiring layer (not illustrated) as wiring formed of a metal material such as Al, Al—Si, and Al—Cu is connected to the heat resistor 126 through a tungsten plug 128. The insulation protective layer 127 is an insulative layer formed of an SiO film, an SiN film, and the like.

On the insulation protective layer 127, multiple protective layers to block the contact with the ink are arranged. The protective layers are formed of a lower protective layer 125, an upper protective layer 124, and a first adhesiveness protective layer 123 and protect a surface of the heat resistor 126 from a chemical and physical impact along with the heat generation by the heat resistor 126. In the present embodiment, the lower protective layer 125 is formed of tantalum (Ta), the upper protective layer 124 is formed of iridium (Ir), and the first adhesiveness protective layer 123 is formed of tantalum (Ta). The protective layers formed of those materials have conductivity.

In addition, on the first adhesiveness protective layer 123, a second adhesiveness protective layer 122 to improve a resistance to the ink and to improve the adhesiveness with an ejection port formation member 12 is arranged. The second adhesiveness protective layer 122 is formed of SiC.

A part of the upper protective layer 124 that is immediately above the heat resistor 126 is a thermal effective portion 124*a* that is put in contact with the ink and applies heat to the ink. In a case where the ink is ejected, it is a harsh environment in which, with the heat generation by the heat resistor 126, a temperature of the ink rises instantaneously, a bubble is generated, the bubble disappears, and cavitation occurs. For this reason, the upper protective layer 124 is formed of an iridium material having a high corrosion resistance and high reliability.

The ejection port formation member 12 in which an ejection port 13 is formed is joined on the second adhesiveness protective layer 122 and forms a flow passage 24 including a pressure chamber 23 between the ejection port formation member 12 and the base. The flow passage 24 includes a supply passage 17*a* and a collection passage 17*b* and is a region surrounded by the ejection port formation member 12 and the base. Additionally, the ejection port formation member 12 includes a partition 22 provided between adjacent thermal effective portions. The partition 22 sections the pressure chamber 23. In the printing element substrate 10 of the present embodiment, in the pressure chamber 23, an ink circulation configuration is employed in which the ink is supplied from the supply passage 17*a*, and the ink is collected to the collection passage 17*b*. Accordingly, in the thermal effective portion 124*a* on the heat resistor 126 arranged between the supply passage 17*a* and the collection passage 17*b*, the ink flows in a direction from the supply passage 17*a* provided on an upstream side to the collection passage 17*b* provided on a downstream side during printing.

In addition, the printing element substrate 10 has the following configuration to suppress the kogation deposited on the upper protective layer 124 on the heat resistor 126 during printing. The kogation of the ink is a phenomenon that occurs in a case where a color material, additives, and the like contained in the ink are degraded on the molecular level by being heated at high temperature, changed into a poorly-soluble substance, and physically absorbed on the upper protective layer 124. Reduction of an abundance ratio of the color material, the additives, and the like that cause the kogation near the surface of the upper protective layer 124 on the heat resistor 126, that is, in the thermal effective portion 124*a* in heating the upper protective layer 124 at high temperature results in the kogation suppression.

Therefore, as the above-described electric field control mechanism, the thermal effective portion 124*a*, which is a part of the upper protective layer 124, is assumed to be one electrode (first electrode). In addition, a counter electrode 129 (second electrode) corresponding to the first electrode is provided on a further downstream side of the collection passage 17*b*, and the printing element substrate 10 forms an electric field via the ink in a liquid chamber including the pressure chamber 23. As the electric field control in the kogation suppression processing, for example, the first electrode 124*a* has a negative electric potential while the second electrode 129 has a positive electric potential, and particles of pigment and the like charged with the negative electric potential in the ink are repelled from the surface of the upper protective layer 124 above the heat resistor 126. With this, the printing element substrate 10 reduces the abundance ratio of the particles of pigment and the like charged with the negative electric potential near the surface of the upper protective layer 124 and thus suppresses the kogation deposited on the upper protective layer 124 on the heat resistor 126.

First Embodiment

<Electric Field Control in Kogation Suppression Processing>

Figure 3A:
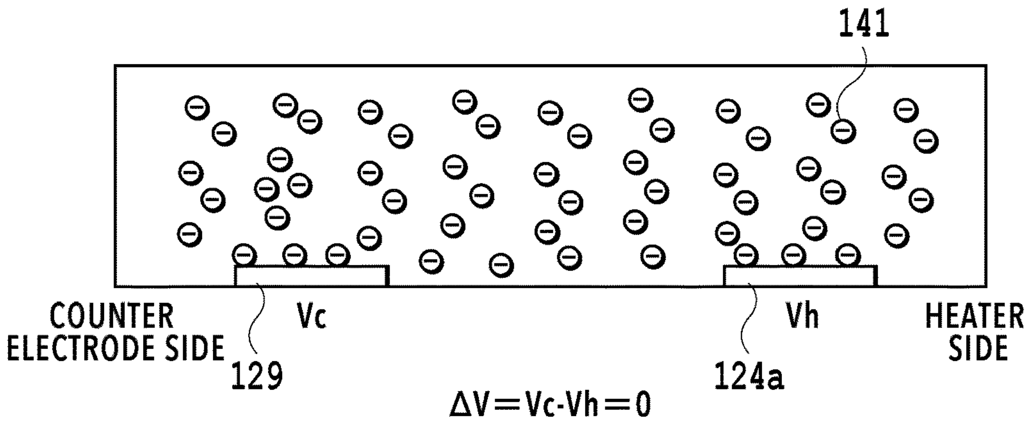
FIGS. 3A to 3C are diagrams describing electric field control in kogation suppression processing.

The kogation suppression processing in the ink ejection apparatus of the present embodiment is described with reference to FIGS. 3A through 3C. The electric field control in the kogation suppression processing is also referred to as electric potential control or electric potential difference control. As illustrated in FIG. 3A, as an electric field control mechanism, the one electrode (first electrode) 124*a* is arranged on the upper protective layer 124 directly above the heat resistor (heater) 126 while the counter electrode (second electrode) 129 is arranged on a downstream side of the flow passage 24, and the ink is filled. In the liquid such as ink, particles 141 of pigment and the like charged with the negative electric potential are contained, and the particles 141 are dispersed substantially uniformly in the liquid.

Figure 3B:
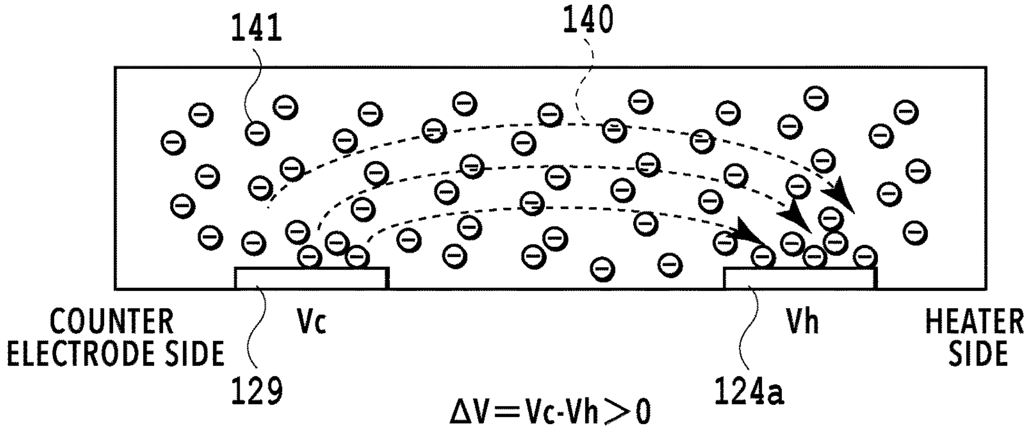

FIG. 3B is a diagram illustrating a state where a voltage is applied such that electric potential Vh of the first electrode 124*a* of the upper protective layer 124 is relatively lower than electric potential Vc of the second electrode 129. For example, an electric potential difference ΔV between the first electrode 124*a* and the second electrode 129 is about 0.5 to 2.5 V. The iridium material forming the above-described upper protective layer 124 is a metal that is eluted by the electrochemical reaction and is a material that does not form an oxide film that prevents the elution by heat. Once the electric potential difference between the two electrodes exceeds 2.5 V, the electrochemical reaction occurs between the first electrode 124*a* and the ink, and a surface of the first electrode 124*a* is eluted into the ink. Accordingly, a preferable electric potential difference is one where the first electrode 124*a* is not eluted, and it is preferred to satisfy the following expression:

$$|\Delta V| \leq 2.5\ \mathrm{V} \qquad \text{Expression (1)}$$

In this case, it is a state where an electric field 140 is formed between the first electrode 124*a* and the second electrode 129 with the ink interposed therebetween, but no current flows. Since the first electrode 124*a* has negative electric potential relative to the second electrode 129, the particles 141 charged with the negative electric potential are repelled from near the surface of the upper protective layer 124, that is, the thermal effective portion 124*a*, and the abundance ratio of the particles 141 near the surface of the thermal effective portion 124*a* is reduced.

Figure 3C:
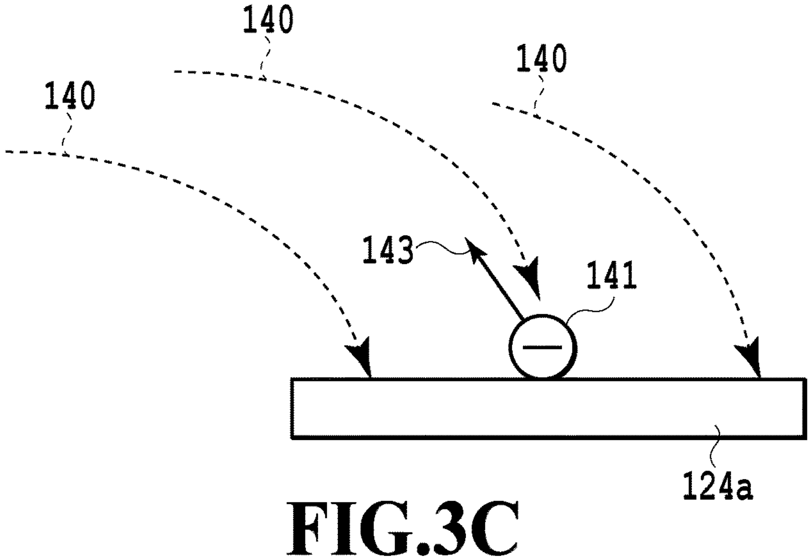

FIG. 3C is an enlarged schematic view of the vicinity of the first electrode 124*a* illustrated in FIG. 3B. The particles 141 charged with the negative electric potential are repelled by repelling force 143 from the surface of the first electrode 124*a* along a line of electric force of the electric field 140 formed in the ink. With the mechanism as above, as the electric potential difference ΔV (=Vc−Vh) between the electric potential Vc of the second electrode 129 and the electric potential Vh of the first electrode 124*a* is greater, the particles 141 charged with the negative electric potential are repelled more, and it is possible to reduce the abundance ratio of the color material, the additives, and the like that cause the kogation.

Figure 4A:
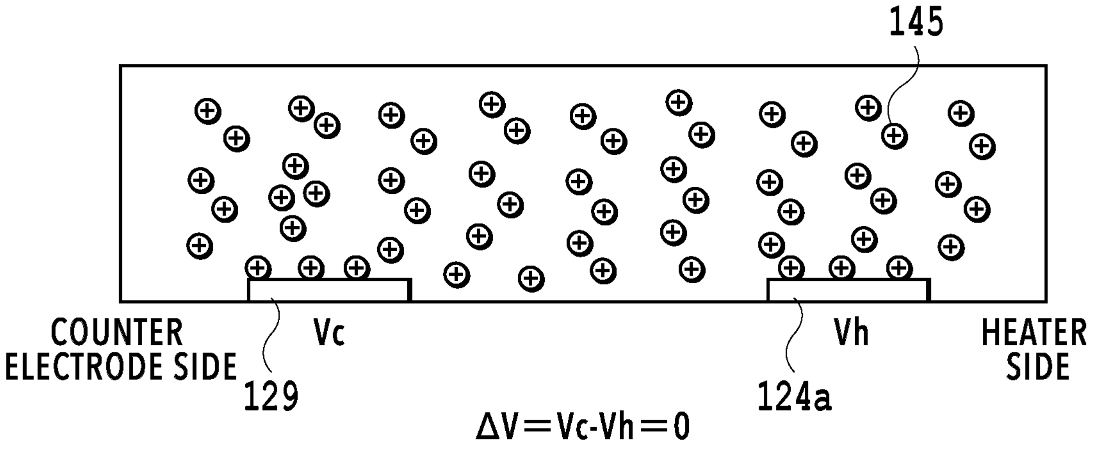
FIGS. 4A and 4B are diagrams describing other electric field control in the kogation suppression processing.
Figure 4B:
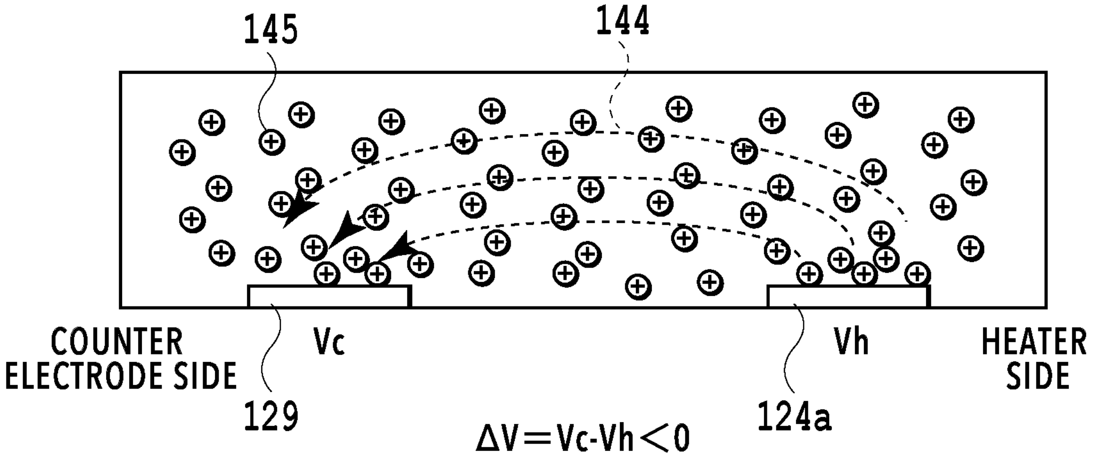

FIG. 4A is a diagram illustrating that particles 145 of pigment and the like charged with the positive electric potential are contained in the ink, and the particles 145 are dispersed substantially uniformly in the ink. FIG. 4B is a diagram illustrating a state where a voltage is applied such that the electric potential Vh of the first electrode 124*a* of the upper protective layer 124 is relatively higher than the electric potential Vc of the second electrode 129. As with the example in FIGS. 3A through 3C, the electric potential difference ΔV between the first electrode 124*a* and the second electrode 129 is about 0.5 to 2.5 V. In this case, it is a state where an electric field 144 is formed between the first electrode 124*a* and the second electrode 129 with the ink interposed therebetween, but no current flows. Since the first electrode 124*a* has positive electric potential relative to the second electrode 129, the particles 145 charged with the positive electric potential are repelled from near the surface of the upper protective layer 124, that is, the thermal effective portion 124*a*, and the abundance ratio of the particles 145 near the surface of the thermal effective portion 124*a* is reduced. Accordingly, it is possible to reduce the abundance ratio of the color material, the additives, and the like that cause the kogation.

Figure 5:
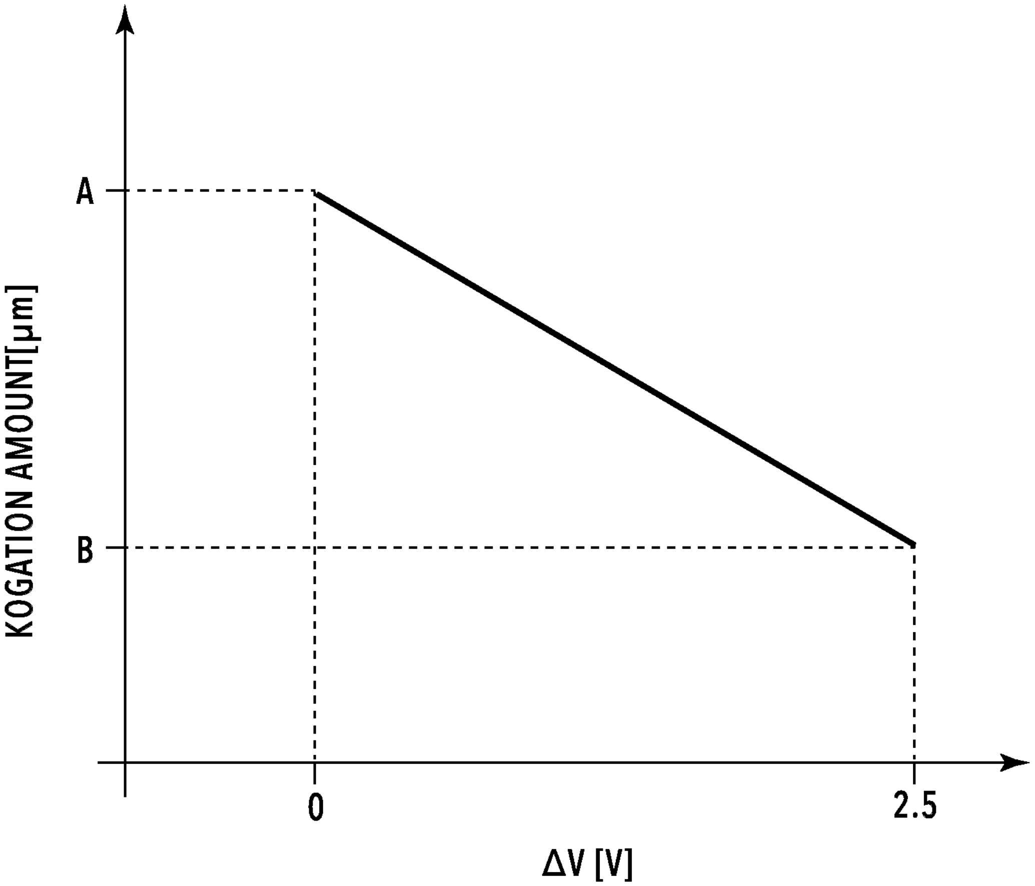
FIG. 5 is a diagram illustrating a relationship between an electric potential difference ΔV and a kogation amount in the kogation suppression processing.

FIG. 5 is a diagram illustrating a relationship between the electric potential difference ΔV and a kogation amount in the kogation suppression processing. For example, in the kogation of the ink, a film thickness of the kogation adhered to the thermal effective portion 124*a* (first electrode) can be identified as the kogation amount. Specifically, it is possible to observe the kogation adhered to the first electrode and presume the film thickness of the kogation from interference fringes. For example, in the example illustrated in FIGS. 3A through 3C, it is assumed that the electric potential difference ΔV between the first electrode 124*a* and the second electrode 129=0 V, and the kogation amount after a predetermined printing job is executed in a predetermined mounting time is A μm. The electric potential difference ΔV is then changed, the same printing job is executed for the same mounting time, and the kogation amount is measured. As illustrated in FIG. 5, as the electric potential difference ΔV is increased, the kogation amount can be reduced substantially linearly until a kogation amount B μm is obtained at the electric potential difference ΔV=2.5 V.

<Communication Control Between Head and Main Body>

Figure 6:
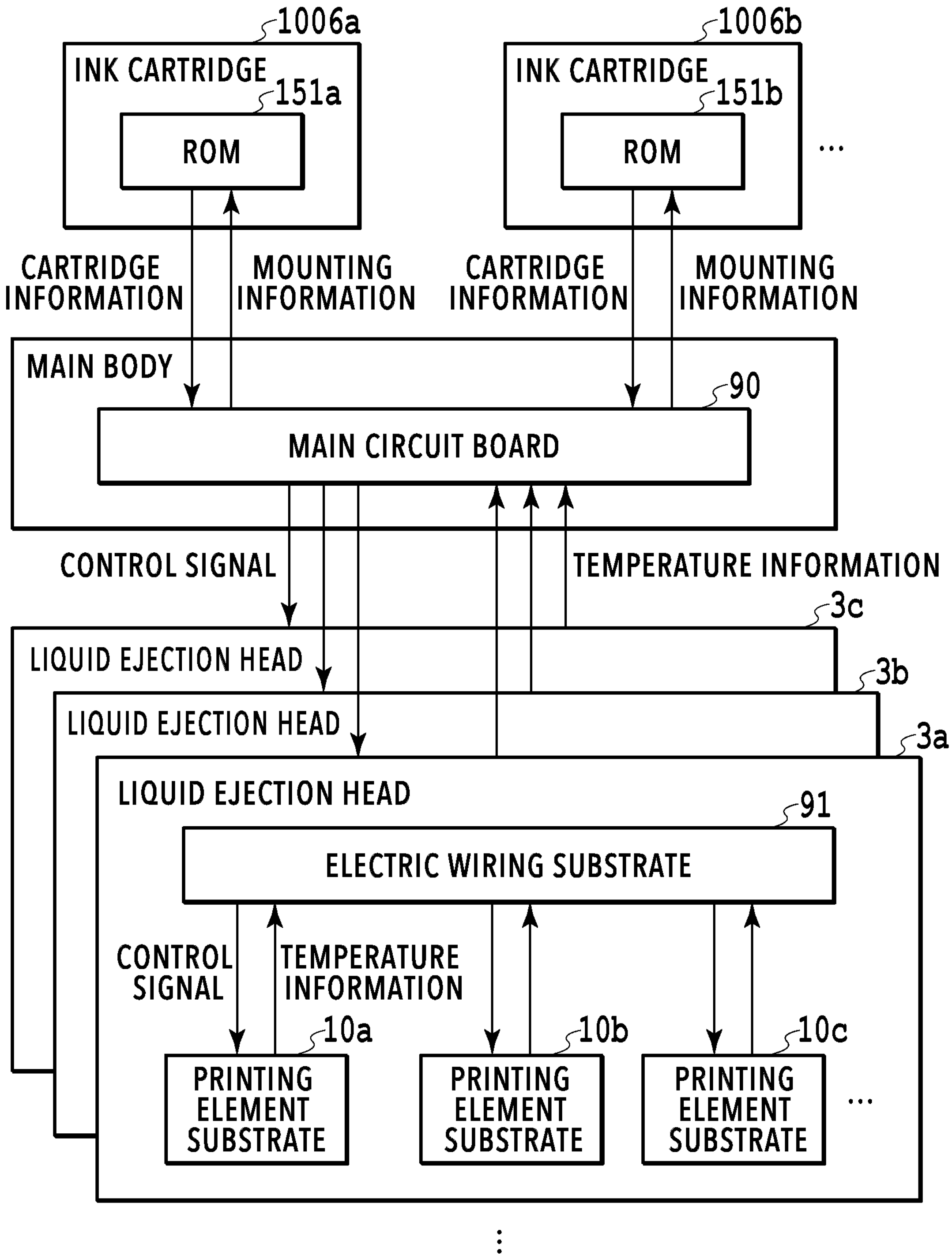
FIG. 6 is a diagram describing communication control between a liquid ejection head and a main body.

Communication control between the liquid ejection head 3 and the main body in the ink ejection apparatus 1000 is described with reference to FIG. 6. A main circuit board 90 built in the main body of the ink ejection apparatus 1000 includes a CPU, a ROM, a RAM, and so on (not illustrated). Ink cartridges 1006*a* and 1006*b* include non-volatile storage units such as ROMs 151*a* and 151*b*, respectively. The main circuit board 90 receives cartridge information such as an ink type, manufacturing date, cartridge capacity, and mounting information in the main body from the ROMs 151*a* and 151*b*. Additionally, the main circuit board 90 writes the mounting information in the main body of an ink cartridge 1006 into the ROMs 151*a* and 151*b*.

Based on the obtained cartridge information, the main circuit board 90 transmits a control signal for the electric field control in the kogation suppression processing of the individual printing element substrate 10 to an electric wiring substrate 91 of each of liquid ejection heads 3*a* to 3*c*. Additionally, the main circuit board 90 receives temperature information on individual printing element substrates 10*a* to 10*c* from the electric wiring substrate 91 of each of the liquid ejection heads 3*a* to 3*c*. Based on the received temperature information, the main circuit board 90 transmits a control signal to drive the individual printing element substrates 10*a* to 10*c* to the electric wiring substrate 91 of each of the liquid ejection heads 3*a* to 3*c*.

<Flow of Kogation Suppression Processing>

Figure 7:
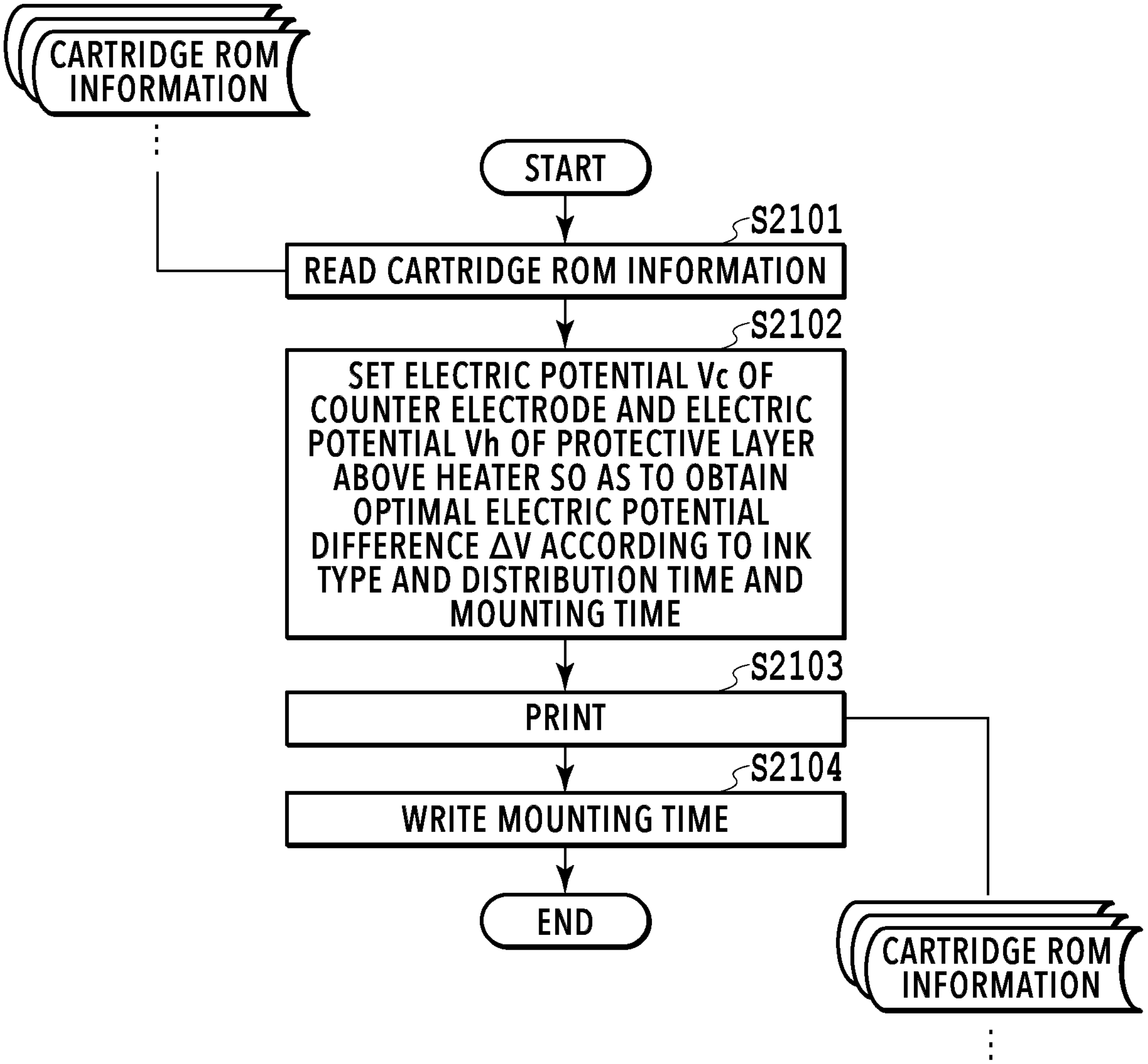
FIG. 7 is a flowchart illustrating a sequence of flow of the kogation suppression processing according to a first embodiment.

FIG. 7 is a flowchart illustrating a sequence of flow of the kogation suppression processing according to a first embodiment. In the following description of the flow, "step S" is abbreviated to "S". Once the printing job is inputted to the main body of the ink ejection apparatus 1000, the processing flow is started. In S2101, the CPU of the main circuit board 90 causes reading of the cartridge information stored in a ROM 151 of the ink cartridge 1006. The cartridge information at least includes a cartridge number, the ink type, the manufacturing date, the cartridge capacity, and the mounting information in the main body.

In S2102, the CPU of the main circuit board 90 sets the electric potential of the thermal effective portion 124*a*, which is a part of the upper protective layer 124, that is, the electric potential Vh of the first electrode 124*a*, and the electric potential Vc of the second electrode 129, which is the counter electrode. The ROM of the main circuit board 90 stores a table in which the optimal electric potential difference ΔV is calculated for a combined time of a distribution time and the mounting time on the main body according to the ink type and the cartridge capacity. A Table 1 is a table illustrating an example of the table in the first embodiment.

TABLE 1

| | | Distribution time + mounting time (year) | | | | | | |
|---|---|---|---|---|---|---|---|---|
| Ink type | Capacity | 0≤ x <0.5 | 0.5≤ x <1.0 | 1.0≤ x <1.5 | 1.5≤ x <2.0 | 2.0≤ x <2.5 | 2.5≤ x <3.0 | 3.0≤x |
| Cyan | Large | −1.20 | −1.25 | −1.30 | −1.35 | −1.40 | −1.45 | −1.50 |
| | Standard | −1.20 | −1.30 | −1.40 | −1.50 | −1.60 | −1.70 | −1.80 |
| Magenta | Large | −1.50 | −1.55 | −1.60 | −1.65 | −1.70 | −1.75 | −1.80 |
| | Standard | −1.50 | −1.60 | −1.70 | −1.80 | −1.90 | −2.00 | −2.10 |
| Yellow | Large | 1.20 | 1.25 | 1.30 | 1.35 | 1.40 | 1.45 | 1.80 |
| | Standard | 1.20 | 1.30 | 1.40 | 1.50 | 1.60 | 1.70 | 2.20 |
| Black | Large | 1.50 | 1.55 | 1.60 | 1.65 | 1.70 | 1.75 | 1.80 |
| | Standard | 1.50 | 1.60 | 1.70 | 1.80 | 1.90 | 2.00 | 2.10 |

As the mounting information in the main body in the cartridge information, the date and time (hereinafter, referred to as mounting date and time) at which the ink cartridge 1006 is mounted on the main body and the mounting time are recorded. The distribution time is (mounting date−manufacturing date)×24 hours, and the mounting time is the time that is updated every time the printing job ends as described later.

A row direction of the Table 1 is divided every half year while converting the combined time of the distribution time and the mounting time into year. A column direction of the Table 1 is divided based on the ink type and the cartridge capacity, which is an ink amount filled in the cartridge. The Table 1 is created with reference to the ink ejection apparatus 1000 in which a large capacity cartridge (Large) and a standard capacity cartridge (Standard) can be mounted as an example. Thus, in the table in the first embodiment, the optimal electric potential difference ΔV is set for the combined time of the distribution time and the mounting time according to the cartridge amount in addition to the ink type.

According to the inputted printing job, the CPU of the main circuit board 90 sets the electric potential Vh of the first electrode 124*a* according to the ink ejection characteristics. Next, the CPU of the main circuit board 90 sets the electric potential Vc of the second electrode 129 so as to obtain a value of the electric potential difference ΔV obtained based on the Table 1. As illustrated in FIG. 6, the set electric potential Vh and electric potential Vc are transmitted to the electric wiring substrate 91 of each of the liquid ejection heads 3*a* to 3*c* as the control signal for the electric field control in the kogation suppression processing of the individual printing element substrate 10.

In S2103, the CPU of the main circuit board 90 performs a sequence of printing while keeping the applying of the electric potential Vh of the first electrode 124*a* and the electric potential Vc of the second electrode 129. After the sequence of printing according to the printing job is completed, in S2104, the CPU of the main circuit board 90 ends the applying of the electric field between the electric potential Vh of the first electrode 124*a* and the electric potential Vc of the second electrode 129. Concurrently, the CPU of the main circuit board 90 updates the mounting time of the cartridge that is stored in the ROM of the main circuit board 90. That is, the CPU of the main circuit board 90 writes the mounting time=current date and time-mounting date and time into the ROM 151 of the ink cartridge 1006. In addition, the CPU of the main circuit board 90 writes the updated mounting time into the ROM 151 of the ink cartridge 1006 and ends the flow.

As described above, it is possible to set the value of the electric potential difference ΔV delicately for the combined time of the distribution time and the mounting time according to the ink type and the cartridge capacity. Thus, it is possible to reduce the abundance ratio of the color material, the additives, and the like that cause the kogation in the portion of the upper protective layer 124 that is directly above the heat resistor 126. Accordingly, it is possible to maintain the optimal ejection characteristics without adhesion of the kogation even under various ink conditions and to suppress the image deterioration in the printing apparatus.

In the present embodiment, the value of ΔV is set based on the ink type, the cartridge capacity, and the combined time of the distribution time and the mounting time; however, a table in which the value of the electric potential difference ΔV is set for every manufacturing lot of the ink may be applied. Likewise, a table may be created by using the physical properties of the ink such as the electric conductance or the permittivity of the ink, the average particle diameter of the pigment, ink viscosity, and the zeta electric potential as a parameter to set the value of the electric potential difference ΔV. Additionally, since an industrial printing apparatus operates all night while keeping the connection to a network, it is possible to change the contents of the ROM of the main circuit board 90 of the ink ejection apparatus 1000 any time. Accordingly, the value of the electric potential difference ΔV may be measured in advance for each parameter described above and stored in the ROM of the main circuit board, or the table may be updated any time according to the mounting time through the network.

Second Embodiment

<Setting of ΔV by Detection of Change in Physical Properties of Ink>

In a second embodiment, as an example of detecting a change in the physical properties of the liquid such as ink and setting the value of the electric potential difference ΔV, the electric conductance (electroconductivity, conductance G) of the ink is measured, and the change in the physical properties of the ink is detected. As the measurement of the conductance G, for example, a small alternating voltage (VAC) is applied between the first electrode and the second electrode, the obtained alternating current (IAC) is measured, and it is possible to calculate G=IAC/VAC.

Figure 8:
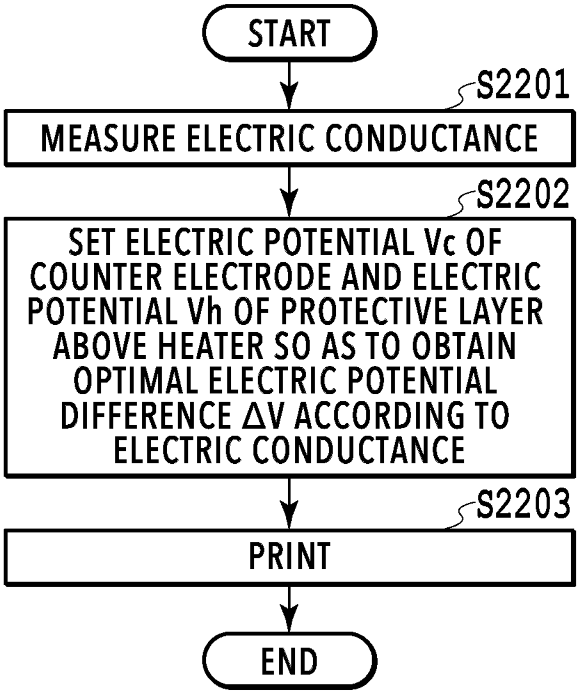
FIG. 8 is a flowchart illustrating a sequence of flow of the kogation suppression processing according to a second embodiment.

FIG. 8 is a flowchart illustrating a sequence of flow of the kogation suppression processing according to the second embodiment. Once the printing job is inputted to the main body of the ink ejection apparatus 1000, the processing flow is started. In S2201, the CPU of the main circuit board 90 measures the electric conductance of each ink type of the ink cartridge 1006 mounted in the ink ejection apparatus 1000.

In S2202, the CPU of the main circuit board 90 sets the electric potential of the thermal effective portion 124*a*, which is a part of the upper protective layer 124, that is, the electric potential Vh of the first electrode 124*a* and the electric potential Vc of the second electrode 129, which is the counter electrode. The ROM of the main circuit board 90 stores a table in which the optimal electric potential difference ΔV is calculated according to the electric conductance of each ink type. A Table 2 is a table illustrating an example of the table in the second embodiment.

TABLE 2

| | Electric conductance(mS/m) | | | | |
|---|---|---|---|---|---|
| Ink type | 6≤ x <8 | 8≤ x <10 | 10≤ x <12 | 12≤ x <14 | 14≤ x <16 |
| Cyan | −1.20 | −1.30 | −1.40 | −1.50 | −1.60 |
| Magenta | −1.50 | −1.60 | −1.70 | −1.80 | −1.90 |
| Yellow | 1.20 | 1.30 | 1.40 | 1.50 | 1.60 |
| Black | 1.50 | 1.60 | 1.70 | 1.80 | 1.90 |

A density of the ink is changed depending on the distribution process and the mounting time in the main body. Therefore, the Table 2 is created by measuring the optimal value of the electric potential difference ΔV in each range of the electric conductance in advance for each ink type. Note that, in the second embodiment, since the electroconductivity of each ink type is directly measured, it is unnecessary to take into consideration the ink amount filled in the cartridge.

According to the inputted printing job, the CPU of the main circuit board 90 sets the electric potential Vh of the first electrode 124*a* according to the ejection characteristics of the ink. Next, according to the measured electric conductance of the ink, the CPU of the main circuit board 90 sets the electric potential Vc of the second electrode so as to obtain a value of the electric potential difference ΔV obtained from the Table 2. As illustrated in FIG. 6, the set electric potential Vh and electric potential Vc are transmitted to the electric wiring substrate 91 of each of the liquid ejection heads 3*a* to 3*c* as the control signal for the electric field control in the kogation suppression processing of the individual printing element substrate 10.

In S2203, the CPU of the main circuit board 90 performs a sequence of printing while keeping the applying of the electric potential Vh of the first electrode 124*a* and the electric potential Vc of the second electrode 129. After the sequence of printing according to the printing job is completed, the applying of the electric potential Vh of the first electrode 124*a* and the electric potential Vc of the second electrode 129 ends.

As described above, the electric conductance (electroconductivity) is actually measured for each ink type, and the value of the electric potential difference ΔV is set delicately; thus, in the portion of the upper protective layer 124 that is directly above the heat resistor 126, it is possible to reduce the abundance ratio of the color material, the additives, and the like that cause the kogation. Thus, it is possible to maintain the optimal ejection characteristics without adhesion of the kogation even under various ink conditions and to suppress the image deterioration in the printing apparatus.

Note that, although the optimal value of the electric potential difference ΔV is set by measuring the electroconductivity of the ink in the second embodiment, it is not limited thereto, and for example, in a case of the ink of low electroconductivity, the permittivity may be measured. As illustrated in FIG. 2, the thermal effective portion 124*a* (first electrode) of the upper protective layer 124 that is directly above the heat resistor 126 and the counter electrode 129 (second electrode) are formed by patterning on the printing element substrate. Accordingly, the size and the distance of the electrode are known accurately. Therefore, it is possible to calculate the permittivity by measuring an electrostatic capacitance assuming that a structure in which the ink is interposed between the first electrode and the second electrode is a capacitor.

Third Embodiment

<Setting of ΔV by Detection of Change in Ejection Characteristics>

In a third embodiment, the electric potential difference ΔV is set by detecting the ejection speed. As described above, once the kogation is adhered to the thermal effective portion 124*a*, a harmful effect occurs on the image formed on the printing medium due to a change in the ejection characteristics, which is particularly a reduction in the ejection speed. Therefore, the change in the ejection speed is detected by printing an ejection speed detection pattern, and thus the electric potential difference ΔV is set.

Figure 9:
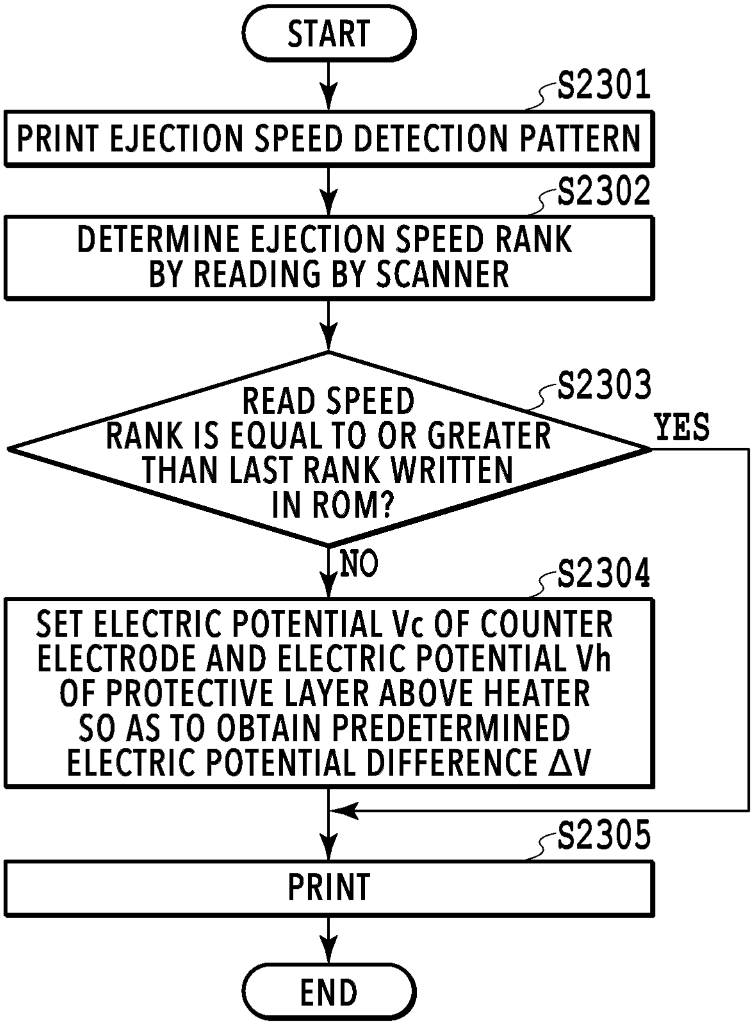
FIG. 9 is a flowchart illustrating a sequence of flow of the kogation suppression processing according to a third embodiment.

FIG. 9 is a flowchart illustrating a sequence of flow of the kogation suppression processing according to the third embodiment. Once the printing job is inputted to the main body of the ink ejection apparatus 1000, the processing flow is started. In S2301, the CPU of the main circuit board 90 causes printing of the ejection speed detection pattern on an arbitrary printing medium. The ejection speed detection pattern is a patch pattern obtained by deviating the ejection timing by 1200 dpi while the liquid ejection head 3 reciprocates. The CPU of the main circuit board 90 reciprocates the printing medium in a case of the ink ejection apparatus including the line type head and reciprocates the liquid ejection head 3 in a case of the ink ejection apparatus of the serial type.

Figure 10A:
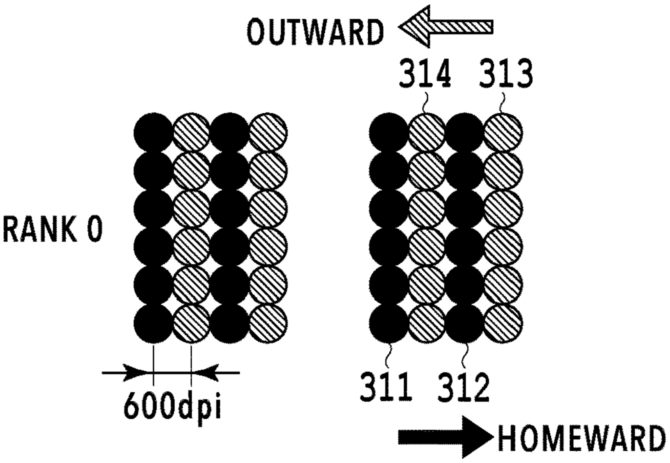
FIGS. 10A to 10E are diagrams illustrating an example of a patch pattern to detect an ejection speed.
Figure 10B:
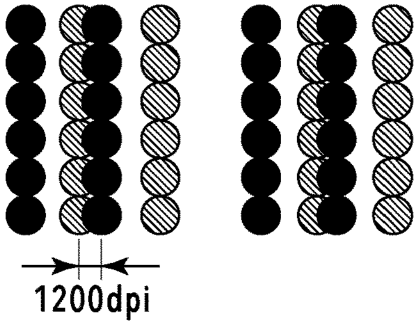

FIGS. 10A through 10E are diagrams illustrating an example of the patch pattern to detect the ejection speed. FIG. 10A is a diagram illustrating a printing state of an ejection speed rank 0 in which a dot row 311 is a first dot row in outward printing, and a dot row 312 is a second dot row ejected by the same nozzle deviated by 300 dpi. In addition, a dot row 313 is a first dot row in homeward printing, and a dot row 314 is a second dot row ejected by the same nozzle deviated by 300 dpi. FIG. 10B is a diagram illustrating a printing state of an ejection speed rank −1, which is an example compared with the ejection speed rank 0 in which the ejection timing is deviated such that the dot in homeward printing is landed later than the dot in outward printing by 1200 dpi.

Figure 10C:
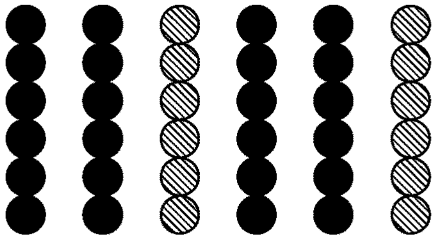
Figure 10D:
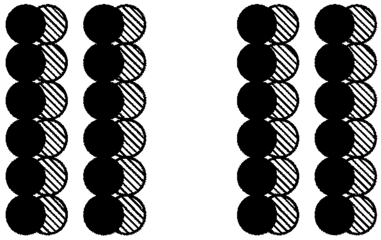
Figure 10E:
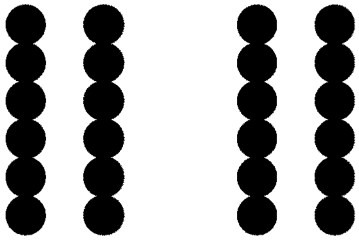

FIG. 10C is a diagram illustrating a printing state of an ejection speed rank −2, which is an example compared with the ejection speed rank 0 in which the ink is landed such that the dot in homeward printing is landed later than the dot in outward printing by 600 dpi. Likewise, FIG. 10D is a diagram illustrating a printing state of an ejection speed rank 1, which is an example compared with the ejection speed rank 0 in which the dot in homeward printing is landed earlier than the dot in outward printing by 1200 dpi. FIG. 10E is a diagram illustrating a printing state of an ejection speed rank 2, which is an example in which the ink is landed such that the dot in homeward printing is landed earlier than the dot in outward printing by 600 dpi.

As an example, the ejection speed detection pattern of the ejection speed rank 1 illustrated in FIG. 10D is printed. In S2302, the CPU of the main circuit board 90 causes reading of the printed ejection speed detection pattern by using a scanner function of the ink ejection apparatus 1000. The CPU of the main circuit board 90 selects a pattern of the highest density from the read patch pattern and determines the ejection speed rank.

In S2303, the CPU of the main circuit board 90 compares the ejection speed rank with the last ejection speed rank stored in the ROM of the main circuit board 90. For example, if the read patch pattern is the ejection speed detection pattern of the ejection speed rank 1 illustrated in FIG. 10D, there is no change in the ejection speed rank; for this reason, the CPU of the main circuit board 90 does not update the value of the electric potential difference ΔV in the kogation suppression processing, and the process proceeds to S2305. Note that, if the ejection speed rank is increased, the process proceeds to S2305 as well.

If the read patch pattern is the ejection speed detection pattern of the ejection speed rank 0 illustrated in FIG. 10A, the ejection speed rank is decreased by one rank; for this reason, the CPU of the main circuit board 90 allows the process to proceed to S2304. In S2304, the CPU of the main circuit board 90 adds a predetermined electric potential difference ΔVx to a value of an electric potential difference ΔV1 set last time and sets an electric potential difference ΔV2 (=ΔV1+ΔVx). The value of the electric potential difference ΔVx to be added may be changed depending on the ink type, changed depending on a value of the combined time of the distribution time and the mounting time of the ink cartridge, or changed depending on a measurement result of the electric conductance and the permittivity of the ink. In addition, if the read patch pattern is the ejection speed detection pattern of the ejection speed rank −1 illustrated in FIG. 10B, the ejection speed rank is decreased by two ranks;

for this reason, the CPU of the main circuit board 90 additionally adds the predetermined electric potential difference ΔVx.

According to the inputted printing job, the CPU of the main circuit board 90 sets the electric potential Vh of the first electrode 124*a* according to the ejection characteristics of the ink. Next, the CPU of the main circuit board 90 sets the electric potential Vc of the second electrode 129 so as to obtain a value of the electric potential difference ΔV2 determined as described above. As illustrated in FIG. 6, the set electric potential Vh and electric potential Vc are transmitted to the electric wiring substrate 91 of each of the liquid ejection heads 3*a* to 3*c* as the control signal for the electric field control in the kogation suppression processing of the individual printing element substrate 10.

In S2305, the CPU of the main circuit board 90 performs the sequence of printing while keeping the applying of the electric potential Vh of the first electrode 124*a* and the electric potential Vc of the second electrode 129. After the sequence of printing according to the printing job is completed, the applying of the electric potential Vh of the first electrode 124*a* and the electric potential Vc of the second electrode 129 ends.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

In a liquid ejection apparatus according to an aspect of the present disclosure, it is possible to set a value of an optimal electric potential difference for various ink conditions; therefore, it is possible to maintain the optimal ejection characteristics with no adhesion of kogation.

This application claims the benefit of Japanese Patent Application No. 2023-068749 filed Apr. 19, 2023, which is hereby incorporated by reference herein in its entirety.

What is claimed is:

1. A liquid ejection apparatus that includes a cartridge containing liquid and a heat resistor generating heat to eject the liquid and that forms an electric field by (1) a first electrode, which is a part of a protective layer protecting a surface of the heat resistor, and (2) a second electrode corresponding to the first electrode with the liquid interposed therebetween, the liquid ejection apparatus comprising:

a reading unit configured to read cartridge information from a storage unit of the cartridge; and a determination unit configured to determine an electric potential difference between electric potential of the first electrode and electric potential of the second electrode according to the cartridge information, wherein the cartridge information includes at least one of an ink type, physical properties of ink, manufacturing date, manufacturing lot of the ink, cartridge capacity, and mounting information in a main body of the cartridge, and wherein the mounting information in the main body includes a mounting time obtained by subtracting mounting date and time of the cartridge from current date and time at which applying of the electric field ends.

2. The liquid ejection apparatus according to claim 1, wherein the physical properties of ink include at least one of electric conductance or permittivity, an average particle diameter of pigment, ink viscosity, and zeta electric potential.

3. A liquid ejection apparatus that includes a cartridge containing liquid and a heat resistor generating heat to eject the liquid and that forms an electric field by (1) a first electrode, which is a part of a protective layer protecting a surface of the heat resistor, and (2) a second electrode corresponding to the first electrode with the liquid interposed therebetween, the liquid ejection apparatus comprising:

a reading unit configured to read cartridge information including manufacturing date of the cartridge and mounting date and time of the cartridge from a storage unit of the cartridge; and a determination unit configured to determine an electric potential difference between electric potential of the first electrode and electric potential of the second electrode according to a combined time of (1) a distribution time obtained by subtracting the manufacturing date from the mounting date and time of the cartridge and (2) a mounting time obtained by subtracting the mounting date and time of the cartridge from current date and time at which applying of the electric field ends.

4. The liquid ejection apparatus according to claim 3, wherein the cartridge information includes an ink type and cartridge capacity, and wherein the determination unit determines the electric potential difference according to the combined time for each ink type and each cartridge capacity.

5. A liquid ejection apparatus that includes a cartridge containing liquid and a heat resistor generating heat to eject the liquid and that forms an electric field by (1) a first electrode, which is a part of a protective layer protecting a surface of the heat resistor, and (2) a second electrode corresponding to the first electrode with the liquid interposed therebetween, the liquid ejection apparatus comprising:

a measurement unit configured to measure physical properties of the liquid; and a determination unit configured to determine an electric potential difference between electric potential of the first electrode and electric potential of the second electrode according to the physical properties of the liquid measured by the measurement unit, wherein the physical properties of the liquid are electric conductance or permittivity of ink, and wherein the measurement unit calculates the permittivity of the ink by measuring an electrostatic capacitance between the first electrode and the second electrode.

6. The liquid ejection apparatus according to claim 5, wherein the measurement unit measures the electric conductance of the ink by applying an alternating voltage between the first electrode and the second electrode.

7. The liquid ejection apparatus according to claim 1, wherein the heat resistor is arranged between a supply passage to supply the liquid and a collection passage to collect the liquid, and wherein the second electrode is arranged on a downstream side of the collection passage.

8. The liquid ejection apparatus according to claim 1, wherein the electric field is formed such that a charged particle in the liquid is repelled from a surface of the first electrode.

* * * * *